United States Patent

[11] 3,599,511

[72] Inventor John E. Storer, Jr.
Indianapolis, Ind.
[21] Appl. No. 856,985
[22] Filed Sept. 11, 1969
[45] Patented Aug. 17, 1971
[73] Assignee General Motors Corporation
Detroit, Mich.

[54] TORQUE CONVERTER TRANSMISSION WITH FREEWHEEL FRICTION CLUTCH
10 Claims, 4 Drawing Figs.

[52] U.S. Cl. ..................................................... 74/718,
192/70, 74/409 (Discl.)
[51] Int. Cl. ...................................................... F16h 47/00,
F16d 13/22, F16h 55/18
[50] Field of Search............................................. 74/718,
730, 677; 192/35, 70

[56] References Cited
UNITED STATES PATENTS
2,649,941 8/1953 Doebeli ........................ 192/35
2,801,719 8/1957 Clerk ............................ 192/35
3,256,751 6/1966 Tuck et al. .................... 74/718
3,433,096 3/1969 Tuck et al. .................... 74/731

Primary Examiner—Arthur T. McKeon
Attorneys—W. E. Finken, A. M. Heiter and Charles R. White ABSTRACT: Torque converter transmission having first and second turbines coupled to associated gearsets for driving a range transmission through a power-combining drive shaft. There is a special freewheel friction clutch between the first turbine gearing and the drive shaft which is subjected to a clutch drag force exerted through a cam mechanism by a tickle spring so that the clutch can be fully engaged by the cam mechanism without lash for a first phase of converter operation. At a predetermined transmission speed ratio first turbine torque becomes negative, the cam mechanism releases the clutch and the second turbine overruns the first turbine. During this second phase of converter operation when only the second turbine is driving, centrifugal force reduces and finally cancels the tickle spring force to eliminate clutch drag. Clutch-engaging cam plates are inertia tickled during rapid speed reduction to exert a drag force on the clutch so that the device will reengage with no backlash when the first turbine provides drive torque.

PATENTED AUG 17 1971 3,599,511
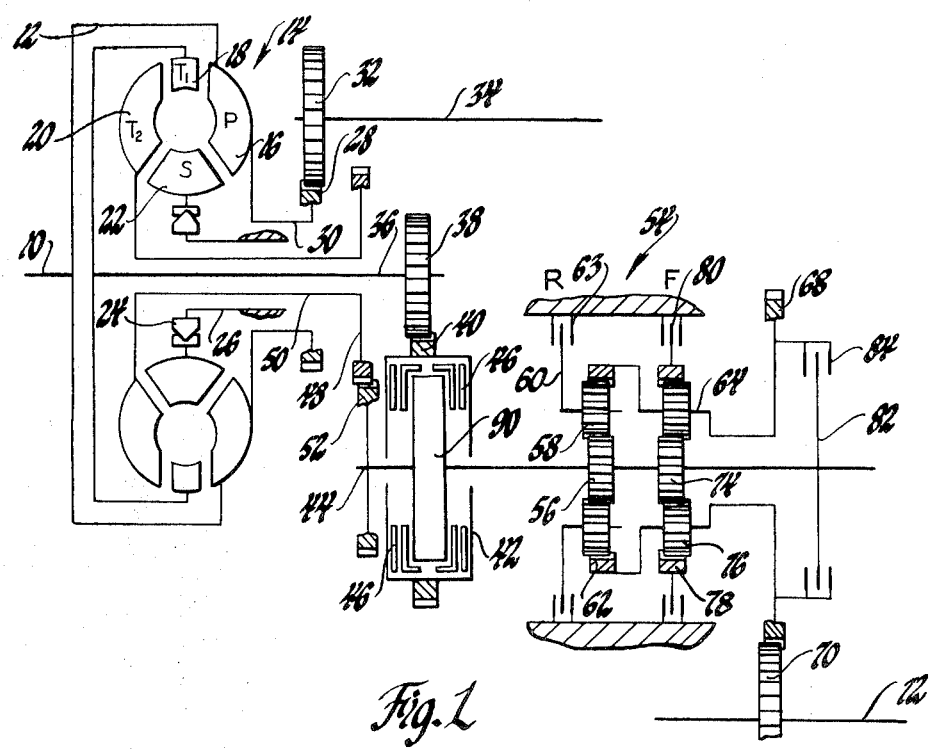
Fig. 1
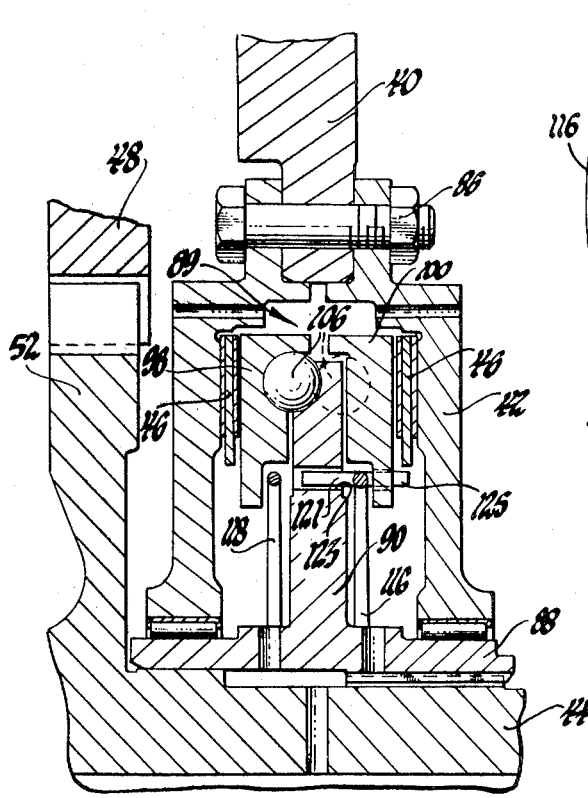
Fig. 2
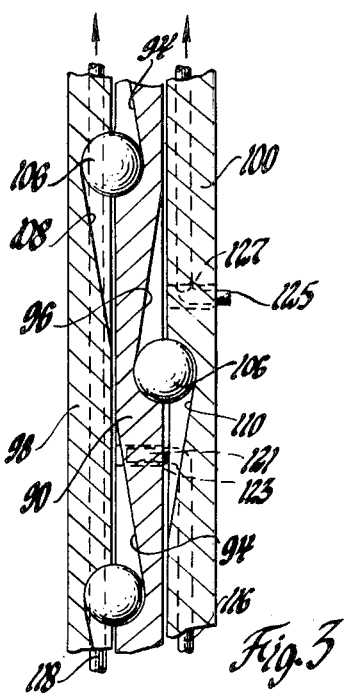
Fig. 3
Fig. 4
INVENTOR.
John E. Storer, Jr.
BY
Charles L. White
ATTORNEY

TORQUE CONVERTER TRANSMISSION WITH FREEWHEEL FRICTION CLUTCH

This invention relates to clutches for power transmissions and more particularly to a freewheel clutch unit for coupling and uncoupling a torque converter rotor and a power-transmitting member.

In operation of a working vehicle such as a shovel loader, torque converter transmissions with two different forward drive gear ratios are usually required; a high-torque gear ratio for crowding into the material to be loaded and a low-torque gear ratio for transporting the load.

In one of the more advanced transmissions for working vehicles, a twin turbine torque converter transmission providing a high stall torque ratio and also high-speed efficiency is utilized. This transmission has sufficient coverage to satisfy the torque requirements for both crowding and transporting the load and provides advanced controls since only shifting in forward and reverse is necessary. In the twin turbine torque converter there are two separate turbines each connected by its own gearset to a power-combining drive shaft.

In a first phase of operation a one-way device connects the drive of the first turbine to the output. During this phase the speed of the first turbine is always held below that speed at which it would rotate if free. This presence of differential speed signifies the presence of positive torque being delivered to the output. This speed differential varies from a maximum value at stall to zero at about one-half speed ratio. Thus the first turbine delivers maximum torque at stall which gradually diminishes to zero torque at about one-half speed ratio. The second turbine is directly connected by gearing to the output. At stall the fluid exiting from the first turbine passes freely through the blading of the second turbine and it produces no drive. As the speed ratio increases from stall, the fluid flow begins to impinge the forward surfaces of the second turbine blading producing forward drive which is additive to the first turbine drive. At about one-half speed ratio the first turbine reaches its free speed and the fluid flows freely through its blading to impinge on the blading of the second turbine. Thus at one-half speed ratio, and beyond, the second turbine provides all drive. Beyond one-half speed ratio the drive of the second turbine tends to overdrive the first turbine. Such tendency to overdrive must proceed backwardly through the one-way device to cause its release. Thus the first turbine rotates freely at above one-half speed ratio avoiding torque losses.

This invention is an improvement in transmissions such as the twin turbine transmission described above and involves a special freewheel clutch unit responsive to converter-operating conditions for phasing a rotor, such as the first turbine of the transmission described above, into and out of driving engagement with a power-combining shaft. This invention may be utilized in place of the conventional one-way clutch between the first turbine gearing and the power combining shaft. The clutch of this invention eliminates the need for selecting a particular type and size of one-way clutch for a particular application since it has high capacity and great durability and effectively responds to torque converter operating conditions for connecting and disconnecting the turbine and the power combining shaft.

In the preferred embodiment of this invention a cam-actuated engageable and disengageable clutch is disposed between the output of the first turbine gearing and a torque-transmitting cam unit drivingly connected to the power combining shaft. A hoop-type torsion spring turns one cam part relative to the other so that the cam can effect light engagement or drag of the clutch. At stall first turbine torque flows through the clutch and the cam unit is further actuated without any backlash to effect the full engagement of the clutch for high-capacity torque transmittal to the power-combining shaft. As the second turbine and the connected power-combining shaft increase in speed to the point where the first turbine can no longer add torque, the cam unit is again actuated to release the clutch apply force. With increasing speed, centrifugal force acts on the torsion spring to gradually remove its clutch apply or tickle force so that clutch drag will become zero at some elevated speed. Under these conditions, the first turbine is fully disconnected from the drive and the second turbine provides the torque. In the event there is a rapid reduction of overrun speed the cam components are forcibly decelerated. The cam plates are inertia powered into position where the clutch may be engaged without lash in the cam system when the second turbine ceases to overrun the first turbine and when there is no relative speed at the friction faces of the clutch components.

In this embodiment of the invention the gearing driven by the first turbine includes an output gear which has spaced sides to house first and second friction plates therein. The cam unit comprises right- and left-hand cams having inclined ramps accommodating ball means also disposed in inclined ramps on either side of a camming disc splined to the power-combining shaft. Also housed within this construction are left- and right-hand torsion springs each of which has one end grounded in the cam disc and the other end connected to the respective cams. These springs tend to close, exerting a light rotational load or clutch drag force to the cams.

These and other features, objects and advantages of this invention will be apparent from the following detailed description and drawings in which:

FIG. 1 is a diagrammatic illustration of a torque converter transmission.

FIG. 2 is a sectional view of a portion of the transmission of FIG. 1 illustrating details of the freewheel phasing clutch of this invention.

FIG. 3 is a developed view which diagrammatically illustrates the camming unit and tickle springs of this invention and;

FIG. 4 is an isometric view of one of the tickle springs of this invention.

The transmission diagrammatically illustrated in FIG. 1 has a power-plant-driven input shaft 10 which is connected to drive the housing 12 of a hydrodynamic torque converter 14. The torque converter has a pump 16 secured for rotation with the housing 12, a first turbine 18, a second turbine 20 and a stator 22. The stator is operatively connected to a one-way brake 24 that in turn is coupled to a ground sleeve 26. A power takeoff gear 28, coupled to the pump by a sleeve shaft 30, meshes with spur gear 32 drivingly connected to power takeoff shaft 34. The first turbine 18 is drivingly connected through a drive shaft 36 to a first turbine gear 38 which meshes with gear 40 to provide a speed-reducing gear ratio. Gear 40 has a hub formed by spaced annular side plates 42 rotatably mounted on an intermediate power transmitting shaft 44. Left and right friction clutches 46, each having an annular floating friction disc, are employed between gear 40 and the intermediate shaft 44 to connect and disconnect the low speed ratio gearing and the intermediate shaft. More details of this clutch construction will be described below in reference to FIGS. 2, 3.

The second turbine assembly is connected to drive a gear 48, disposed adjacent to low speed gear 38, through a sleeve shaft 50 that surrounds drive shaft 36. Gear 48 meshes with a gear 52 to provide a speed-increasing ratio, preferably an overdrive. Gear 52 is drivingly secured to the intermediate shaft 44.

When clutch 46 is applied, the torque developed by both turbines can be routed to the intermediate shaft by the gearing described. When clutch 46 is released, only the second turbine can drive the intermediate shaft and power flows from the second turbine to this shaft through the speed-increasing gearing 48 and 52.

The intermediate shaft provides the input to a two-speed forward and reverse transmission unit 54. As illustrated in FIG. 1, the intermediate shaft drives the sun gear 56 of a first planetary gearset that meshes with the planetary pinions 58 which are rotatably mounted on a carrier 60 and which mesh with a ring gear 62. The carrier may be retarded from rotation by application of a reverse brake 63 so that the sun gear when driven in one direction will drive the ring gear in an opposite direction. This ring gear is connected to a carrier 64 which forms part of a second planetary gearset described below and which is connected to drive the transfer drive gear 68. The transfer drive gear meshes with a gear 70 which drives transmission output shaft 72.

The intermediate shaft 44 also drives a sun gear 74 of the second planetary gearset which meshes with planetary pinions 76 rotatably mounted on the carrier 64. These pinions mesh with a ring gear 78 that may be held for reaction by the engagement of a low brake 80 to provide for forward reduction drive of the output carrier 64 and the connected transfer gear 68. The intermediate shaft further drives an annular friction disc or plate 82 which can be connected by application of a high-speed clutch 84 to the transfer drive gear 68. As shown, the clutch is connected directly to this transfer gear.

The transmission unit 54 is conditioned for high-speed operation when only clutch 84 is engaged, for forward reduction drive when only brake 80 is engaged and for reverse drive when only brake 63 is engaged.

Referring now to FIG. 2, there is shown the special construction for effecting the simultaneous engagement and disengagement of the left and right clutches 46. The gear 40 is securely fastened to the spaced annular side plates 42 by a series of nut and bolt fasteners 86 and the side plates are rotatably mounted by suitable bearings on the axially extending sleeve 88 forming part of a cam assembly 89. The sleeve is splined to the intermediate shaft 44 as shown. The cam assembly comprises an annular hub or disc 90 radially projecting from the sleeve which extends between the spaced side plates 42. Each side of the disc has six equally spaced cam slots near the edge formed with inclined cam surfaces 94 and 96 best shown in FIG. 3. The cam assembly further comprises annular right- and left-hand cam plates 98 and 100 each having six inwardly facing and spaced slots which align with the slots on the annular disc 90 forming 12 compartments each containing a camming ball 106. The slots in the right- and left-hand cam plates have inclined cam surfaces 108 and 110 respectively. FIG. 3 illustrates the position of the cam plates when the second turbine has overrun the first turbine and the clutches 46 are disengaged.

Again referring to FIG. 2, it will be seen that the free-floating friction plates of clutches 46 are disposed between the cam plates and the inner surfaces of the adjacent side plates 42. These friction plates when actuated by the cam assembly serve to frictionally couple the side plates to the cam plates and the balls when displaced from their FIG. 3 position drivingly connect the cam plates to the annular disc 90 of the cam assembly.

Right- and left-hand torsion springs 116 and 118 are used to provide a light turning or tickle force to the cam plates in the same direction to effect the outward lateral movement of the cam plates. This causes the cam plates to apply a light drag force on the friction plates so that there will subsequently be a soft but rapid self-energizing engagement of the clutches for the first phase of converter operation in which the first turbine provides maximum torque at stall.

When the torque developed by the first turbine becomes negative and detrimental to high-efficient converter operation, the second turbine overruns the first turbine and the cam assembly effects disengagement of clutches 46 to release the first turbine from the drive for a second phase of converter operation as will be further described below.

The right-hand torsion spring 116 has an inwardly extending anchor end 121 that projects into an opening 123 in the cam disc and has an outwardly extending anchor end 125 that projects into opening 127 in the cam plate 100. The left-hand torsion spring is similar with one anchor end fixed to the cam disc and the other anchor end fixed to the cam plate 98.

Each tension spring produces a closing or wind-down spring force of 2.5 pounds, for example. This wind-down force urges both cam plates in the same rotational direction with respect to the cam disc as shown by the small arrows in FIG. 3 to take up all lash in the cam system. The balls will roll up on the inclined planes 108 and 110 to force the cam plates 98 and 100 axially in opposite directions to establish initial drag force on both clutches 46. As first turbine torque is transmitted by the clutches to the cam plates, the clutch engagement force exerted by the cam plates increases. First turbine torque is transmitted through the fully engaged clutches and the balls 106 to the disc 90 and the combining shaft.

Backlash in the system described is effectively eliminated since the torsion springs maintain a light rotational load on the cam plates so that the cam system is operative to induce an axial tickle force on the friction faces. Since the torsion springs have moved the cams to a position where there is no lost motion or lash, the clutches 46 can be fully engaged without delay.

At about one-half speed ratio the second turbine begins to overrun the first turbine and provide all of the positive torque. The cam disc 90 will overrun the cam plates until the relative position shown in FIG. 3 is obtained. In this position the balls are in the deepest part of the ramps and cannot provide any camming action so that clutches 46 will be released and negative first turbine torque cannot detract from transmission operation. The closing force of the torsion spring becomes progressively weaker as the overrun speed of the cam disc increases and as centrifugal force acting on the spring increases. At speeds slightly above overrun the spring tickle force is cancelled and parasitic clutch drag is fully eliminated.

With reduction of overrun speed as for instance when caused by increasing torque on the transmission, the converter will change from second phase operation back to the first phase of operation. When such a speed reduction occurs, the disc 90, the cam plates and the tickle spring are all forcibly decelerated. Under these conditions the cam plates are inertia powered or tickled into a position in which the friction plates can be engaged by the cam plates without lost motion between the balls and cam surfaces. However, full positive drive engagement of the clutches is inhibited until a synchronous speed has been reached between the side plates 42 and the cam plates 98 and 100. If torque demand subsequently decreases and the speed ratio again increases, the converter will enter into the second phase of operation as previously described.

It will be appreciated that the construction shown is only illustrative of this invention. I wish it to be understood that the invention is not limited to the particular details of construction shown and described, for obvious modifications will occur to a person skilled in the art.

I claim:

1. In a power transmission, an input and an output, a hydrodynamic torque converter having a pump operatively connected to said input and having at least first and second turbines, power-transmitting means operatively connected to said output, first gearset means operatively connected to said first turbine, second gearset means drivingly connecting said second turbine and said power-transmitting means, clutch means operatively disposed between said first gearset means and said power-transmitting means for connecting and disconnecting said first turbine and said power-transmitting means, actuator means for effecting the engagement and disengagement of said clutch means, said actuator means comprising first and second cam means relatively rotatable between a first relative position in which said first and second cam means are drivingly connected to effect the full torque-transmitting engagement of said clutch means and a second relative position in which said first and second cam means permit the disengagement of said clutch means, and tickle spring means operatively connected to said first and second cam means to relatively rotate said first and second cam means toward said first relative position to effect an initial slipping engagement of said clutch means by said first cam means so that said first gearset means subsequently relatively rotates said first and second cam means to said first relative position to cause the full torque-transmitting engagement of said clutch means so that the torque developed by said first turbine is fully transmitted to said power transmission means.

2. In a power transmission, an input and an output, a hydrodynamic torque converter having a pump operatively connected to said input and having first and second turbines and having a stator, power transmission means drivingly connected to said output, first gearset means operatively connected to said first turbine, second gearset means operatively connecting said second turbine to said power transmission means, clutch means for connecting and disconnecting said first gearset means and said power transmission means, cam means mounted for limited turning movement with respect to said power transmission means for effecting the engagement and disengagement of said clutch means, spring means operatively connected to said cam means for applying a predetermined turning force to turn said cam means to a first predetermined position to effect the initial engagement of said clutch means so that said first turbine can further turn said cam means to a second predetermined position to effect the full torque-transmitting engagement of said clutch means.

3. In a power transmission, an input member and an output member, torque transmission means having an input driven by said input member and having first and second outputs rotatable at different speeds, first gear means driven by said first output, second gear means driven by said second output, each of said gear means having a separate output gear, power transmission means for drivingly connecting said output gear of said second gear means to said output member, clutch means for connecting and disconnecting said output gear of said first gear means and said power transmission means, cam means for effecting the disengagement of said clutch means in response to the increase in speed of said output gear of said second gear means to a speed higher than the speed of said output gear of said first gear means and further for effecting the engagement of said clutch means in response to the increase in speed of said output gear of said first gear means to a speed higher than the speed of said output gear of said second gear means, said camming means comprising a hub member operatively connected to and driven by said power transmission means and comprising a clutch-engaging plate member, said camming means further comprising movable cam members operatively disposed between said hub member and said plate member to move said plate member into engagement with said clutch means in response to the predetermined movement of said plate member relative to said hub member, said clutch means comprising friction means disposed between said plate and said output gear of said first gearset, and spring means disposed around said power transmission means for operatively connecting said hub member and said plate member for turning said plate member to a predetermined position relative to said hub member to effect the initial frictional engagement of said friction means to permit said output gear of said first gear means to subsequently turn said plate member to a position relative to said hub member to cause the full frictional engagement of said friction means by said plate member, and recess means in said hub member and said plate member for receiving said movable cam members in another predetermined relative position of said hub member and said plate member to release said friction means and permit said power transmission means to overrun the output of gear of said first gearset.

4. In a power transmission, an input member and an output member, a hydrodynamic torque converter having a pump operatively connected to said input member and having first and second turbines and a stator, power transmission means operatively connected to said output member, first gearset means driven by said first turbine and having an output gear, second gearset means driven by said second turbine and having an output gear operatively connected to said power transmission means, clutch means engageable to connect said output gear of said first gearset means and said power transmis-sion means, said clutch means comprising spaced friction means, cam means disposed between said friction means for effecting the engagement of said friction means, and cam operator means drivingly secured to said power transmission means for rotation therewith and extending from said power transmission means to a position between said cam means and being operative to move both of said cam means outwardly to effect the simultaneous engagement of said friction means in response to the attainment of the predetermined speed of said output gear of said first gearset with respect to that of the output gear of said second gearset and further to effect the simultaneous disengagement of said friction means by said cam means in response to overrun of said output gear of said second gearset with respect to the output gear of said first gearset.

5. In a power transmission, an input and an output, a torque converter having a plurality of operating phases and having a pump operatively connected to said input, said converter also having first turbine means for providing torque in a first of said operating phases and having second turbine means for providing torque in all of said operating phases, first gearing means drivingly connected to said first turbine means, power transmission means operatively connected to said output, second gearing means drivingly connected to said second turbine means and to said power transmission means, torque direction-responsive drive-establishing means operative to automatically establish and interrupt a drive between said first turbine means and said power transmission means in response to predetermined changes in operating phases of said converter, said drive-establishing means comprising friction means engageable to transmit torque from said first gearing means to said power transmission means and cam means mounted for limited rotary movement on said power transmission means and driven in a first rotary direction by said first turbine means through said friction means to a first position as said first turbine means develops torque to effect an initial slipping engagement of said friction means and subsequently to a second position to effect a full torque-transmitting engagement of said friction means so that substantially all torque developed by said first turbine means is transmitted to said power transmission means.

6. The power transmission of claim 5 wherein said first gearing means has an output gear with a hub rotatably mounted on said power transmission means, first and second friction plates disposed adjacent to interior walls of said hub, first and second cams disposed inside of said hub and adjacent to said friction plates, said cam means comprising a cam disc drivingly connected to said power transmission means disposed between said first and second cams, said cam disc and said cams having aligned ramps formed therein, and ball means disposed in each of said ramps for moving said cams outwardly to effect the full engagement of said friction means in response to only one direction of torque transmittal from said first turbine.

7. In a transmission, an input and an output, a hydrodynamic torque converter having a pump operatively connected to said input and having at least first and second turbines, power transmitting means operatively connected to said output, a first gearset, first connecting means for drivingly connecting said first turbine to said first gearset, a second gearset drivingly connected to said output, second connecting means for drivingly connecting said second turbine to said second gearset, clutch means for connecting and disconnecting said first gearset means and said power transmitting means, said clutch means comprising friction means and comprising relatively rotatable first and second cam means with cam members operatively disposed therebetween, said first cam means being movable laterally to effect engagement of said friction means in response to rotation of said first cam means relative to said second cam means in a predetermined direction, and spring means operatively connecting said first and second cam means to apply a predetermined force to rotate said first cam means which responds by engaging said friction means with a force sufficiently low permitting said friction means to slip under predetermined converter operating conditions, and connecting means drivingly connecting said second cam means to said output so that the force of rotational inertia moves said second cam means in response to sudden deceleration of said power-transmitting means to a point relative to said first cam means to permit said clutch to be fully engaged by said first cam means at an input-to-output-speed ratio lower than a predetermined speed ratio with minimum lost motion between said first and second cam means.

8. The transmission defined in claim 7 wherein said spring means is a helical spring which has one end connected to one of said cam means and the other end connected to the other of said cam means and which exerts a force tending to relatively rotate said cam means as said spring attempts to wind in and further which exerts a decaying force on said cam means as centrifugal force acting on said spring increases after a predetermined transmission operating speed and exerts a wind-out force thereon to counteract and finally cancel the wind-in force of said spring so that said first cam means does not engage said friction means.

9. The transmission defined in claim 7 wherein said friction means are spaced friction rings, said first cam means being spaced cams inboard of said friction rings, said second cam means being a cam hub operatively disposed between said spaced cams, said spaced cams and said cam hub having cooperating inclined cam ramps therein which face each other, a cam ball operatively disposed in the recess formed by each pair of facing cam ramps, and first and second hoop-type springs for exerting a predetermined force on said cam hub and each said spaced cams for rotating said spaced cams in the same direction so that said spaced cams will be moved axially by operation of said balls and said cam ramps to exert a tickle force on said friction rings so that said first gearset can effect the full torque engagement of said friction rings, and without lash in said cam system.

10. The transmission defined in claim 7 wherein said spring means has at least one coil with respective ends connecting the first and second cam means for initially relatively rotating said cam means to effect a tickle force on said friction means and response to increasing transmission speeds and centrifugal force thereon to exert a decreasing force on said cam means to gradually decrease said tickle force until there is no parasitic drag on said friction means at predetermined operating speeds subsequent to the disconnection of said friction means and the total drive of said output by said second turbine.